(12) United States Patent
Westmacott (10) Patent No.: US 7,340,650 B2
(45) Date of Patent: Mar. 4, 2008

(54) METHOD TO MEASURE STORED PROCEDURE EXECUTION STATISTICS

(75) Inventor: Jago R. Westmacott, London (GB)

(73) Assignee: JP Morgan Chase & Co., New York, NY (US)

( * ) Notice: Subject to any disclaimer, the term of this patent is extended or adjusted under 35 U.S.C. 154(b) by 733 days.

(21) Appl. No.: 10/341,841

(22) Filed: Jan. 14, 2003

(65) Prior Publication Data

US 2004/0088278 A1    May 6, 2004

Related U.S. Application Data

(60) Provisional application No. 60/422,273, filed on Oct. 30, 2002.

(51) Int. Cl.
*G06F 11/00* (2006.01)
(52) U.S. Cl. .......................... 714/38; 714/37; 717/127; 717/131; 717/135
(58) Field of Classification Search ................... 714/38
See application file for complete search history.

(56) References Cited

U.S. PATENT DOCUMENTS

| | | |
|---|---|---|
| 3,872,448 A | 3/1975 | Mitchell, Jr. |
| 4,751,702 A | 6/1988 | Beier et al. |
| 5,748,978 A | 5/1990 | Rees et al. |
| 5,027,269 A | 6/1991 | Grant et al. |
| 5,075,881 A | 12/1991 | Blomberg et al. |
| 5,159,687 A | 10/1992 | Richburg |
| 5,168,444 A | 12/1992 | Cukor et al. |
| 5,202,986 A | 4/1993 | Nickel |
| 5,278,982 A | 1/1994 | Daniels et al. |
| 5,313,616 A | 5/1994 | Cline et al. |
| 5,347,518 A | 9/1994 | Lee et al. |

(Continued)

FOREIGN PATENT DOCUMENTS

WO    WO95/03586    2/1995

(Continued)

OTHER PUBLICATIONS http://manuals.sybase.com/onlinebooks/group-as/asg1250e/clilib/@Generic__BookView.*

(Continued)

*Primary Examiner*—Yolanda L Wilson
(74) *Attorney, Agent, or Firm*—Lowenstein Sandler PC (57) ABSTRACT

The invention is a method to obtain actual stored procedure execution statistics while an overlying application is running. The method is accomplished by a software module running in background and acquires the execution statistics, including database writes and reads, for every stored procedure run. Statistics, such as the number of database writes and reads, are reported by the application's underlying database supervisory program. The resulting execution statistics are analyzed and selected information is saved to a stored procedure statistics database. Because the module can be run continuously in background, it can develop statistics for all procedure calls made under varying computing conditions with varying calling parameter sets. A statistical analysis of such acquired stored procedure execution statistics is useful for evaluating new versions of the complex software application, new stored procedures, modified stored procedures, and for locating a specific cause of application failure or reduced performance as caused by a malformed or malfunctioning stored procedure. Additionally, the method can flag anomalous performance, warning of previously undetected failure.

16 Claims, 6 Drawing Sheets

U.S. PATENT DOCUMENTS

| | | | |
|---|---|---|---|
| 5,386,551 A | 1/1995 | Chikira et al. | |
| 5,446,895 A | 8/1995 | White et al. | |
| 5,455,946 A | 10/1995 | Mohan et al. | |
| 5,471,613 A | 11/1995 | Banning et al. | |
| 5,471,629 A | 11/1995 | Risch | |
| 5,482,139 A | 1/1996 | Rivalto | |
| 5,511,117 A | 4/1996 | Zazzera | |
| 5,539,885 A | 7/1996 | Ono et al. | |
| 5,549,117 A | 8/1996 | Tacklind et al. | |
| 5,563,998 A | 10/1996 | Yakish et al. | |
| 5,566,297 A | 10/1996 | Devarakonda | |
| 5,594,863 A | 1/1997 | Stiles | |
| 5,630,047 A | 5/1997 | Wang | |
| 5,630,069 A | 5/1997 | Flores et al. | |
| 5,630,173 A | 5/1997 | Oprescu | |
| 5,655,074 A | 8/1997 | Rauscher | |
| 5,701,470 A | 12/1997 | Joy et al. | |
| 5,712,971 A | 1/1998 | Stanfill et al. | |
| 5,721,913 A | 2/1998 | Ackroff et al. | |
| 5,721,914 A | 2/1998 | De Vries | |
| 5,752,034 A | 5/1998 | Srivastava et al. | |
| 5,758,061 A | 5/1998 | Plum | |
| 5,758,062 A * | 5/1998 | McMahon et al. | 714/38 |
| 5,764,972 A | 6/1998 | Crouse et al. | |
| 5,768,506 A | 6/1998 | Randell | |
| 5,774,553 A | 6/1998 | Rosen | |
| 5,781,448 A | 7/1998 | Nakamura et al. | |
| 5,784,557 A | 7/1998 | Oprescu | |
| 5,784,562 A | 7/1998 | Diener | |
| 5,787,402 A | 7/1998 | Potter et al. | |
| 5,799,297 A | 8/1998 | Goodridge et al. | |
| 5,806,075 A | 9/1998 | Jain et al. | |
| 5,828,883 A | 10/1998 | Hall | |
| 5,832,523 A | 11/1998 | Kanai et al. | |
| 5,835,770 A | 11/1998 | Shum et al. | |
| 5,842,196 A | 11/1998 | Agarwal et al. | |
| 5,845,292 A | 12/1998 | Bohannon et al. | |
| 5,845,293 A | 12/1998 | Veghte et al. | |
| 5,872,976 A | 2/1999 | Yee et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,907,846 A | 5/1999 | Berner et al. | |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,978,477 A | 11/1999 | Hull et al. | |
| 5,995,965 A | 11/1999 | Experton | |
| 6,003,075 A | 12/1999 | Arendt et al. | |
| 6,009,274 A | 12/1999 | Fletcher et al. | |
| 6,009,405 A | 12/1999 | Leymann et al. | |
| 6,012,087 A | 1/2000 | Freivald et al. | |
| 6,014,671 A | 1/2000 | Castelli et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,061,503 A | 5/2000 | Chamberlain | |
| 6,061,643 A * | 5/2000 | Walker et al. | 702/123 |
| 6,061,686 A | 5/2000 | Gauvin et al. | |
| 6,065,009 A | 5/2000 | Leymann et al. | |
| 6,067,412 A | 5/2000 | Blake et al. | |
| 6,073,107 A | 6/2000 | Minkiewicz et al. | |
| 6,081,808 A | 6/2000 | Blackman et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,108,698 A | 8/2000 | Tenev et al. | |
| 6,125,390 A | 9/2000 | Touboul | |
| 6,128,708 A | 10/2000 | Fitzpatrick et al. | |
| 6,138,112 A | 10/2000 | Slutz | |
| 6,138,158 A | 10/2000 | Boyle et al. | |
| 6,145,121 A * | 11/2000 | Levy et al. | 717/135 |
| 6,163,776 A | 12/2000 | Periwal | |
| 6,167,534 A * | 12/2000 | Straathof et al. | 714/38 |
| 6,175,833 B1 | 1/2001 | West et al. | |
| 6,188,400 B1 | 2/2001 | House et al. | |
| 6,195,676 B1 | 2/2001 | Spix et al. | |
| 6,226,652 B1 | 5/2001 | Percival et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,256,635 B1 | 7/2001 | Arrouye et al. | |
| 6,263,121 B1 | 7/2001 | Melen et al. | |
| 6,266,683 B1 | 7/2001 | Yehuda et al. | |
| 6,269,479 B1 | 7/2001 | Puram | |
| 6,279,008 B1 | 8/2001 | Tung Ng et al. | |
| 6,279,039 B1 | 8/2001 | Bhat et al. | |
| 6,301,701 B1 * | 10/2001 | Walker et al. | 717/125 |
| 6,311,320 B1 | 10/2001 | Jibbe | |
| 6,311,327 B1 | 10/2001 | O'brien et al. | |
| 6,336,122 B1 | 1/2002 | Lee et al. | |
| 6,353,897 B1 * | 3/2002 | Nock et al. | 714/38 |
| 6,356,920 B1 | 3/2002 | Vanderslius | |
| 6,363,499 B1 | 3/2002 | Delo et al. | |
| 6,363,524 B1 | 3/2002 | Loy | |
| 6,381,609 B1 | 4/2002 | Breitbart et al. | |
| 6,385,618 B1 | 5/2002 | Ng et al. | |
| 6,397,221 B1 | 5/2002 | Greef et al. | |
| 6,405,209 B2 | 6/2002 | Obendorf | |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,411,957 B1 | 6/2002 | Dijkstra | |
| 6,418,446 B1 | 7/2002 | Lection et al. | |
| 6,418,448 B1 | 7/2002 | Sarkar | |
| 6,418,451 B1 | 7/2002 | Maimone | |
| 6,424,981 B1 | 7/2002 | Isaac et al. | |
| 6,438,749 B1 | 8/2002 | Chamberlain | |
| 6,446,126 B1 | 9/2002 | Huang et al. | |
| 6,449,623 B1 | 9/2002 | Bohannon et al. | |
| 6,453,310 B1 | 9/2002 | Zander | |
| 6,456,995 B1 | 9/2002 | Salo et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,477,540 B1 | 11/2002 | Singh et al. | |
| 6,490,581 B1 | 12/2002 | Neshatfar et al. | |
| 6,502,095 B2 | 12/2002 | Breitbart et al. | |
| 6,502,104 B2 | 12/2002 | Fung et al. | |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,532,467 B1 | 3/2003 | Brocklebank et al. | |
| 6,535,894 B1 | 3/2003 | Schmidt et al. | |
| 6,539,337 B1 | 3/2003 | Provan et al. | |
| 6,539,383 B2 | 3/2003 | Charlet et al. | |
| 6,539,397 B1 | 3/2003 | Doan et al. | |
| 6,539,398 B1 | 3/2003 | Hannan et al. | |
| 6,546,506 B1 | 4/2003 | Lewis | |
| 6,557,039 B1 | 4/2003 | Leong et al. | |
| 6,560,580 B1 | 5/2003 | Fraser et al. | |
| 6,571,249 B1 | 5/2003 | Garrecht et al. | |
| 6,574,640 B1 | 6/2003 | Stahl | |
| 6,578,004 B1 | 6/2003 | Cimral et al. | |
| 6,578,006 B1 | 6/2003 | Saito et al. | |

| | | |
|---|---|---|
| 6,578,129 B1 | 6/2003 | da Silva Junior et al. |
| 6,584,447 B1 | 6/2003 | Fox et al. |
| 6,587,841 B1 | 7/2003 | DeFrancesco et al. |
| 6,591,260 B1 | 7/2003 | Schwarzhoff et al. |
| 6,601,017 B1 | 7/2003 | Kennedy et al. |
| 6,601,018 B1 | 7/2003 | Logan |
| 6,601,075 B1 | 7/2003 | Huang et al. |
| 6,601,233 B1 | 7/2003 | Underwood |
| 6,626,953 B2 | 9/2003 | Johndrew et al. |
| 6,629,266 B1 | 9/2003 | Harper et al. |
| 6,651,076 B1 | 11/2003 | Asano |
| 6,665,086 B2 | 12/2003 | Hull et al. |
| 6,678,705 B1 | 1/2004 | Berchtold et al. |
| 6,681,380 B1 | 1/2004 | Britton et al. |
| 6,691,139 B2 | 2/2004 | Ganesh et al. |
| 6,697,835 B1 | 2/2004 | Hanson et al. |
| 6,701,514 B1 | 3/2004 | Haswell et al. |
| 6,711,594 B2 | 3/2004 | Yano et al. |
| 6,714,219 B2 | 3/2004 | Lindhorst et al. |
| 6,763,384 B1 | 7/2004 | Gupta et al. |
| 6,772,411 B2* | 8/2004 | Hayes et al. ............... 717/127 |
| 6,820,088 B1 | 11/2004 | Hind et al. |
| 6,880,010 B1 | 4/2005 | Webb et al. |
| 6,918,013 B2 | 7/2005 | Jacobs et al. |
| 6,920,467 B1* | 7/2005 | Yoshimoto ................ 707/202 |
| 6,934,934 B1* | 8/2005 | Osborne et al. ........... 717/126 |
| 6,938,072 B2 | 8/2005 | Berman et al. |
| 2002/0004912 A1 | 1/2002 | Fung |
| 2002/0007287 A1 | 1/2002 | Straube et al. |
| 2002/0029228 A1 | 3/2002 | Rodriguez et al. |
| 2002/0038226 A1 | 3/2002 | Tyus |
| 2002/0038320 A1 | 3/2002 | Brook |
| 2002/0049666 A1 | 4/2002 | Reuter et al. |
| 2002/0065695 A1 | 5/2002 | Francoeur et al. |
| 2002/0083034 A1 | 6/2002 | Orbanes et al. |
| 2002/0091702 A1 | 7/2002 | Mullins |
| 2002/0116205 A1 | 8/2002 | Ankireddipally et al. |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143774 A1 | 10/2002 | Vandersluis |
| 2002/0143929 A1 | 10/2002 | Maltz et al. |
| 2002/0144101 A1 | 10/2002 | Wang et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2002/0178439 A1 | 11/2002 | Rich et al. |
| 2002/0188765 A1 | 12/2002 | Fong et al. |
| 2003/0004848 A1 | 1/2003 | Hellerstein et al. |
| 2003/0014421 A1 | 1/2003 | Jung |
| 2003/0018666 A1 | 1/2003 | Chen et al. |
| 2003/0018952 A1 | 1/2003 | Roetzheim |
| 2003/0027561 A1 | 2/2003 | Iyer |
| 2003/0033586 A1 | 2/2003 | Lawler |
| 2003/0041000 A1 | 2/2003 | Zajac et al. |
| 2003/0046313 A1 | 3/2003 | Leung et al. |
| 2003/0050931 A1 | 3/2003 | Harman et al. |
| 2003/0065644 A1* | 4/2003 | Horman et al. ............... 707/1 |
| 2003/0069975 A1 | 4/2003 | Abjanic et al. |
| 2003/0070158 A1 | 4/2003 | Lucas et al. |
| 2003/0088593 A1 | 5/2003 | Stickler |
| 2003/0120539 A1 | 6/2003 | Korium et al. |
| 2003/0126151 A1 | 7/2003 | Jung |
| 2003/0131007 A1 | 7/2003 | Schirmer et al. |
| 2003/0140045 A1 | 7/2003 | Heninger et al. |
| 2003/0140280 A1* | 7/2003 | Kaler et al. ............... 714/37 |
| 2003/0140308 A1 | 7/2003 | Murthy et al. |
| 2003/0144868 A1 | 7/2003 | MacIntyre et al. |
| 2003/0145047 A1 | 7/2003 | Upton |
| 2003/0163603 A1 | 8/2003 | Fry et al. |
| 2003/0167266 A1 | 9/2003 | Saldanha et al. |
| 2003/0167445 A1 | 9/2003 | Su et al. |
| 2003/0177118 A1 | 9/2003 | Moon et al. |
| 2003/0177341 A1 | 9/2003 | Devillers |
| 2003/0188290 A1 | 10/2003 | Corral |
| 2003/0191849 A1 | 10/2003 | Leong et al. |
| 2003/0196190 A1 | 10/2003 | Ruffolo et al. |
| 2003/0212518 A1 | 11/2003 | DæAlessandro et al. |
| 2003/0217033 A1 | 11/2003 | Sandler et al. |
| 2003/0217083 A1 | 11/2003 | Taylor |
| 2003/0218633 A1 | 11/2003 | Mikhail et al. |
| 2003/0225662 A1 | 12/2003 | Horan et al. |
| 2003/0225663 A1 | 12/2003 | Horan et al. |
| 2003/0229825 A1* | 12/2003 | Barry et al. ............... 714/38 |
| 2004/0060006 A1 | 3/2004 | Lindblad et al. |
| 2004/0122872 A1 | 6/2004 | Pandya et al. |
| 2005/0027658 A1 | 2/2005 | Moore et al. |
| 2005/0060345 A1 | 3/2005 | Doddington |
| 2005/0065987 A1 | 3/2005 | Telknowski et al. |
| 2005/0071807 A1 | 3/2005 | Yanai |
| 2005/0193376 A1* | 9/2005 | Harrison ............... 717/127 |

FOREIGN PATENT DOCUMENTS

| | | |
|---|---|---|
| WO | WO96/34350 | 10/1996 |
| WO | WO01/74043 | 10/2001 |
| WO | WO02/046980 | 6/2002 |

OTHER PUBLICATIONS

Agostini; A Light Workflow Management System Using Simple Process Models, Cooperation Technologies Laboratory, Disco-University of Milano-Bicoca.

Basili et al.; Understanding and Predicting the Process of Software Maintenance Releases; 18th International Conference on Software Engineering (ICSE '96), Mar. 25, 1996; p. 464; (Abstract).

Chen et al; Improving Index Performance Through Prefetching, School of Computer Science, Carnegie Mellon University; Dec. 2000.

Code Generation for DB Applications; IBM Corporation; Mar. 1992; p. 1-3.

Deng et al.; A Probabilistic Approach to Fault Diagnosis in Linear Lightwaves Network, Department of Electrical Engineering, Columbia University, New York, National University of Singapore; May 1992, pp. 1-22.

Duggan, Michael A., 2.40 General—Reviews and Abstracts; Administration on Computing Centers; Feb. 1, 1974.

Georgakopoulos et al.; An Overview of Workflow Management: From Process Modeling to Workflow Automation Infrastructure; Kluwer Academic Publishers, Boston; Distributed Parallel Databases 3; 1995; p. 119-153.

Hellerstein; A Generalized Search Tree for Database Systems, UC Berkeley; Jan. 19, 1996.

Hilbert, D.M., Redmiles, D.F., An Approach to Large Scale Collection of Application Usage Data Over the Internet, Apr. 19-25, 1998, 136-145, Proceedings of the 1998 International Conference on Software Engineering.

Hudepohl et al.; Integrating Metrics and Models for Software Risk Assessment; The Seventh International Symposium on Software Reliability Engineering (ISSRE '96); Oct. 30, 1996; p. 93.

Hsu, J.M., Banerjee, P., Performance Measurement and Trace Driven Simulation of Parallel Cad and Numeric Applications on a Hypercube Multicomputer; May 28-31, 1990, pp. 260-269, 17th Annual International Symposium on Computer Architecture.

Mahrenholz, D., Minimal Invasive Monitoring, May 2-4, 2001, pp. 251-258, Fourth IEEE International Symposium on Object-Oriented Real-Time Distributed Computing, 2001. Magdeburg, Germany.

Mohapatra et al.; Defect Prevention Through Defect Prediction: A Case Study at Infosys; IEEE International Conference on Software Maintenance (ICSM '01); Nov. 7, 2001; p. 260 (Abstract), Florence, Italy.

Moser; Transactions in a Distributed Object Environment, Department of Electrical and Computer Engineering, University of California; Jun. 19, 2005.

Muehlen;Business Process Modeling and Workflow Management; Department of Information Systems, University of Muenster, Germany; p. 1-18.

Business Process Automation and Workflow in the Financial Industry; CSK Software AG; Version 3; Sep. 10, 2003; p. 1-37.

OS/2EE Database; Manager SQLJRA Remote Protocol; IBM Corporation; IBM TDB N101-93; Jan. 1993; p. 33-36.

Performance Measurement and Trace Driven Simulation of Parallel Cad and Numeric Applications on a Hypercube Multicomputer, Appears in IEEE Transactions on Parallel and Distributed Systems, pp. 451-464, Jul. 1992, vol. 3-Issue 4.

Quantitative Monitoring of Software Development by Time-Based and Intercheckpoint Monitoring, Appears in Software Engineering Journal, pp. 43-49, Jan. 1990, vol. 5, Issue 1.

Ramakrishnan; Tree-Structured Indexes Module 2, Lectures 3 and 4.

Sammet, Jean E., Beginning of 4.6 Software Evaluation, Tests and Measurements and RMF I/O Time Validation, Nov. 1, 1981.

Steigner, C. Wilke, J. Wulff, I., Integrated Performance Monitoring of Client/Server Software, Oct. 2-4, 2000, pp. 395-402, 1st European Conference on Universal Multiservice Networks 2000, ECUMN 2000.

Strom et al.; Gryphon: An Information Flow Based Approach to Message Brokering, IBM TJ Watson Research Center.

Van Steen et al.; A Model for Worldwide Tracking of Distributed Objects; Vrije Universiteit, Amsterdam.

Vanbommel et al.; Genetic Algorithms for Optimal Logical Database Design; Information and Software Technology, 1994; 36 (12) p. 725-732.

Wohlin et al.; Understanding the Sources of Software Defects: A Filtering Approach; 8th International Workshop on Program Comprehension (IWPC '00); Jun. 10, 2000; p. 9; Abstract; Limerick, Ireland.

Xu et al.; ERDRAW: An XML-Based ER-Diagram Drawing and Translation Tool.

Betwixt: Turning Beans into XML, Apache Software Foundation, Archived Jun. 20, 2002 at <http://web.archive.org/web/20020620000410/http://jakarta.apahce.org.commons/betwixt/>, p. 1 of 1, Nov. 13, 2005.

Castor: Using Castor XML, Exolab Group, Archived Aug. 27, 2001 at <http://web.archive.org/web/20011019155934/http://www.castor.org/XML-framework.html>, Retrieved from the Internet on Nov. 11, 2005.

Hamilton; Javabeans. Sun Microsystems, Chapter 8, Aug. 8, 1997.

International Conference on Software Engineering (CSE'96), Mar. 25-29; p. 464; (Abstract).

Pitt and McNiff; Java, RMI: The Remote Method Innovation Guide, Addison Wesley Professional, ISBN: 0201-70043-3, Section 3.5, 3 pages.

Reinhart; Liability Management: A New Tool for Financial Consultants, Financial Consultant, vol. 1, No. 3, pp. 7-11, Fall/Winter 1996, ISSN 1091-644X, Dialog File 15, Accession No. 01395382.

Campione, et al.; Special Edition Using Java Tutorial, Third Edition: A Short Course on the Basics, Addison Wesley Professional ISBN: 0201-70393-9, 21 pages from Chapter 5, Dec. 28, 2000.

Deckmyn, Dominique; San Francisco Manages $45m Project Via Web-Based Service, Computerworld, Aug. 9, 1999, vol. 33, No. 32, p. 14.

Deutsch et al.; Storing Semistructured Date with Stored; pp. 431-442.

Jagadish et al.; Timber: A Native XML Database; The VLDB Journal (2002); pp. 274-291; Published Online Dec. 19, 2002.

Jagadish et al; Tax: A Tree Algebra for XML; University of Michigan, Ann Arbor, MI; pp. 149-164; 2002.

Kutler; A Different Drummer on the Data Highway, American Banker, Section: No. 91, vol. 160, May 12, 1995, p. 14.

McConnell; Gauging Software Readiness with Defect Tracking; IEEE; May/Jun. 1997.

Programmer's Guide; Monitor Client Library 12.5; Document ID 32865:01-1250-01.

Trading and Capital-Markets Activities Manual, Instrument Profiles: Structured Notes, Federal Reserve System, The Turin Group, www.toerien.com/books/manual/4040.htm, printed Jul. 24, 2002, 14 pages.

Unknown; Conjuring up com through scripting, p. 14, Jul. 2000.

Yu, et al.; An Analysis of Several Software Defect Models; IEEE Transactions on Software Engineering, vol. 14., No. 9; Sep. 1988.

* cited by examiner

| Stored Procedure Name | Avg Executions | Avg Reads pre | Avg Reads post | Avg Reads % Inc | Avg Writes pre |
|---|---|---|---|---|---|
| otc_create_trade_init | 100 | 3989 | 3985 | 0 | 82 |
| otc_get_trade_details | 315 | 69 | 158 | 128 | 13 |
| otc_get_trades_for_prtf | 100 | 127 | 373 | 193 | 40 |
| otc_save_trade | 92 | 548 | 1217 | 122 | 487 |
| otc_cancel_unwind_swa | 9 | 245 | 376 | 53 | 331 |

| Stored Procedure Name | Avg Writes post | Avg Writes % Inc | Avg Duration pre | Avg Duration post | Avg Duration % Inc |
|---|---|---|---|---|---|
| otc_create_trade_init | 56 | -31 | 10.74 | 1.12 | -89 |
| otc_get_trade_details | 22 | 69 | 3.2 | 3.6 | 12 |
| otc_get_trades_for_prtf | 73 | 82 | 0.68 | 0.72 | 5 |
| otc_save_trade | 31 | -456 | 31.18 | 9.08 | -70 |
| otc_cancel_unwind_swa | 369 | -93 | 3.42 | 4.01 | 17 |

FIG. 6

METHOD TO MEASURE STORED PROCEDURE EXECUTION STATISTICS

CROSS REFERENCE TO RELATED APPLICATIONS

This application claims the benefit of U.S. Provisional Applications Ser. No. 60/422,273 filed Oct. 30, 2002. The 60/422,273 application is incorporated herein by reference.

FIELD OF THE INVENTION

This invention relates to a method for evaluating the performance of a complex software application program, and in particular a method for obtaining and analyzing the execution statistics for stored procedure calls to a database.

BACKGROUND OF THE INVENTION

Complex software for business and financial applications is usually accessed from a terminal on an employee's desk. The employee's terminal or workstation generally functions as client in a client-server environment. That is, the employee's terminal (client) is running some software locally, but depends on other software and data on another computer (server) on a network, or on a network of servers.

Typically large sets of data needed by an application are contained in files managed and queried by a database program. Many large software applications, including custom built programs, interface directly to commercial database programs. The user of the high level business software is generally unaware of the software interface to the database program.

The information in databases is stored in computer files. The information is typically further subdivided into records containing sets of related information in fields. Each field typically contains single data element. At a most basic level, the database can establish key fields for quickly accessing certain records. These basic database operations are managed by the database program and function autonomously of the calling application.

The calling application, such as a custom financial trading program for a financial institution, interacts with the database through a high level database interaction language called a structured query language (SQL). Individual SQL commands representing queries to the database resemble programming lines of high level programming languages. Generally several lines of SQL code are needed to fulfill a given database operation such as a database query. The set of SQL commands might be used over and over again. It can be saved as a set under one name as a "procedure". A saved set is called a stored procedure. The stored procedure can be saved as a compiled file by the database program for fast execution. In practice stored procedures are slightly modified SQL queries that are formed into functions and loaded into the database. They are executed using input parameters, and in return, supply a result set of data.

High level application programs that make repeated calls to databases can make use of many stored procedures. Since the stored procedures are sections of executable computer code, they use computer resources, largely by causing reads and writes to the database via the database supervisory program along with the associated execution times. The stored procedures are almost always run with input parameters. The particular input parameters invoked for a given stored procedure call are supplied by the application program. These parameters may be copies of user entered data, derived, or calculated by the application program. The parameters input to a stored procedure may vary widely in the application's actual real-time operating environment.

Stored procedures may remain static, or they may be modified during the life of a given version of the business or financial application program. New versions of the application might introduce new or modified stored procedures. It is crucial to test applications with modified or new stored procedures as well as new applications using existing stored procedures, to ensure that the procedures are performing correctly. One measure of correct operation of the overall application is the time of execution for the applications stored procedures.

One way to measure stored procedure execution performance, is to query the database application itself, after a called stored procedure is executed. The supervisory database can generally return statistics associated with a particular stored procedure execution. The most significant statistics are the number of reads and writes that a procedure causes in the database. The time of execution from stored procedure call to the time of returned data is also interesting, but somewhat less important since it is more a function of the speed of the network at that moment, and the performance of various hardware platforms than strictly a measure of the procedure performance itself.

Figure 1A:
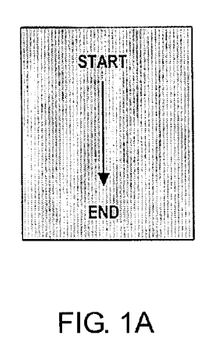
FIG. 1A shows an exemplary stored procedure with only one executable path.
Figure 1B:
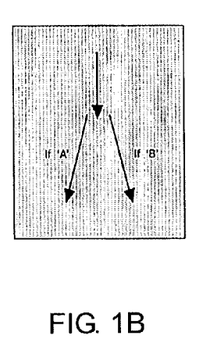
FIG. 1B shows an exemplary stored procedure with one "IF" statement capable of selecting either of two paths.
Figure 1C:
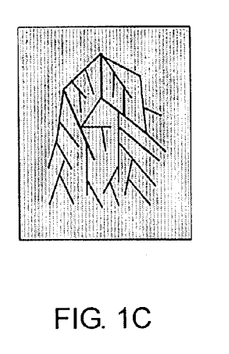
FIG. 1C shows an exemplary stored procedure with many possible combinations of executable paths.

Most stored procedures incorporate various execution paths. The particular combination of execution paths that runs for a given stored procedure call depends on the parameters passed to the stored procedure on that particular call. FIG. 1A shows the simplest case of a stored procedure with only one execution path that runs the same way regardless of any input parameter. FIG. 1B shows the concept of an execution path set by an input parameter, this procedure having only one "IF" choice of two executable paths. And, finally FIG. 1C shows the more common scenario where a tree of possible executable paths exists within a stored procedure.

Manual testing is unlikely to be able to characterize many permutations of the possible number of execution paths through a stored procedure. And, it is impractical, if not impossible, to verify all executable paths for all combinations of input parameters. Therefore, it would be highly desirable to implement a method for the automatic return of all stored procedure execution statistics, including database writes and reads, for all procedures called by an application in its real-time running environment. While this still might not test all possible permutations of execution paths, it would at least exercise most paths run in the high level application's normal operating environment.

SUMMARY OF THE INVENTION

The invention is a method to obtain actual stored procedure execution statistics while an overlying application is running. The method is accomplished by a software module running in background and acquires the execution statistics, including database writes and reads, for every stored procedure run. Statistics, such as the number of database writes and reads, are reported by the application's underlying database supervisory program. The resulting execution statistics are analyzed and selected information is saved to a stored procedure statistics database.

Because the module can be run continuously in background, it can develop statistics for all procedure calls made under varying computing conditions with varying calling parameter sets. A statistical analysis of such acquired stored procedure execution statistics is useful for evaluating new versions of the complex software application, new stored procedures, modified stored procedures, and for locating a specific cause of application failure or reduced performance as caused by a malformed or malfunctioning stored procedure. Additionally, the method can flag anomalous performance, warning of previously undetected failures.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale. All modules, stored procedures, databases, and applications can be recorded on computer readable media.

DESCRIPTION

Figure 2:
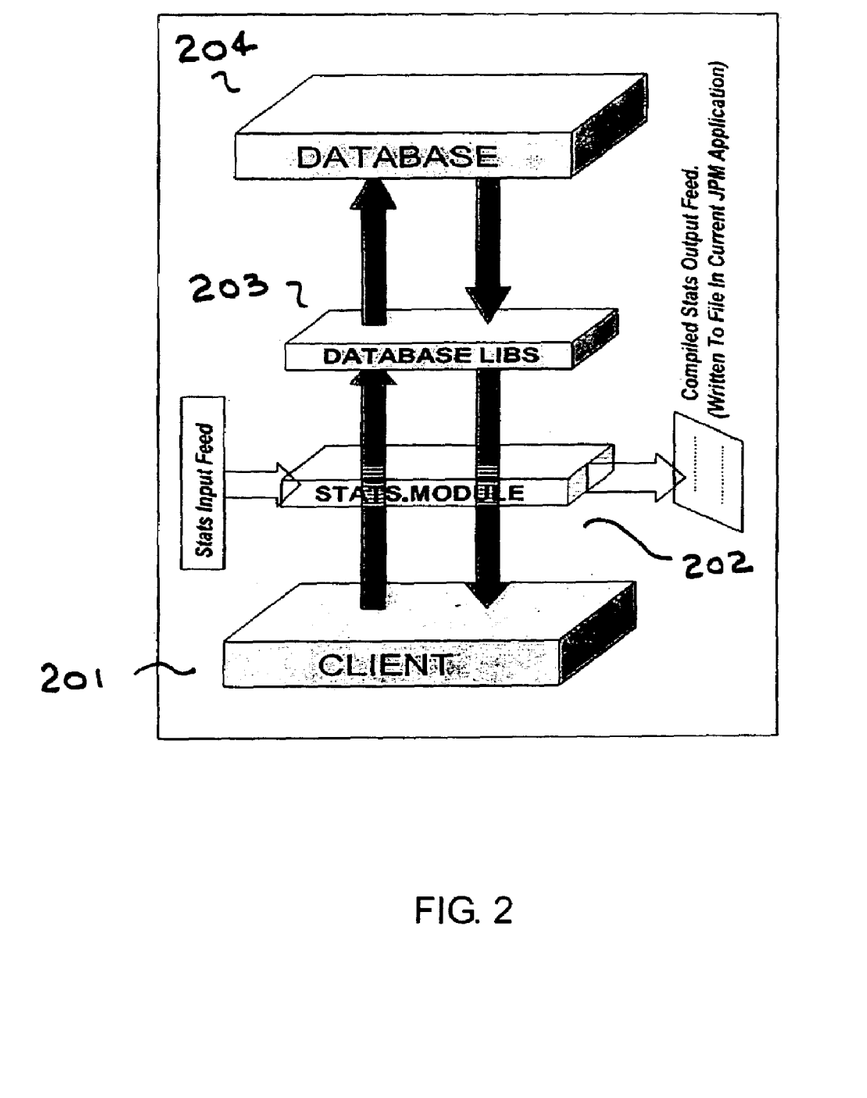
FIG. 2 shows the location of the statistics plug in module.

A plug-in is a software module of a larger software application. The inventive module plugs into a business or financial application that makes use of stored procedure calls to databases on remote servers. It collects stored procedure actual execution statistics, analyzes them, and returns the results of the analysis. It can be switched on or off by a user. The module 202, as shown in FIG. 2, runs transparently in background, meaning it's use of computational resources has virtually no impact on the performance of the application and the running of the application is unaffected whether the module is running or not. In other words, the system behaves exactly as it would were the entire statistics module removed. The statistics module is located between the client 201 and the database libraries 203 associated with database 204. Database 204 can reside on a server located on a network.

Complex business and financial applications may incorporate many stored procedures, each having many possible internal execution paths. Rather than attempt to manually, or even automatically, test each execution path, one run at a time, the inventive statistics module monitors and records run data for every call made to a stored procedure during the normal or simulated operation of the overlying high level application programs. This solution to the testing problem trades 100% execution path testing under non-operating conditions for a far more useful evaluation of stored procedures during actual operating conditions in their actual working computing environment.

The inventive module obtains the stored procedure execution statistics from the underlying database program. Thus by the inventive method, accurate stored procedure execution statistics are continuously collected in the application's real-time environment and across the full range of calling parameters. Statistics acquired in this way are extremely valuable for the identification systematic problems in a new version of an application, locating problems in a new or modified stored procedure, and for establishing accurate projections of needed computing resources and computing overhead for safely and reliably running large distributed applications.

Figure 3:
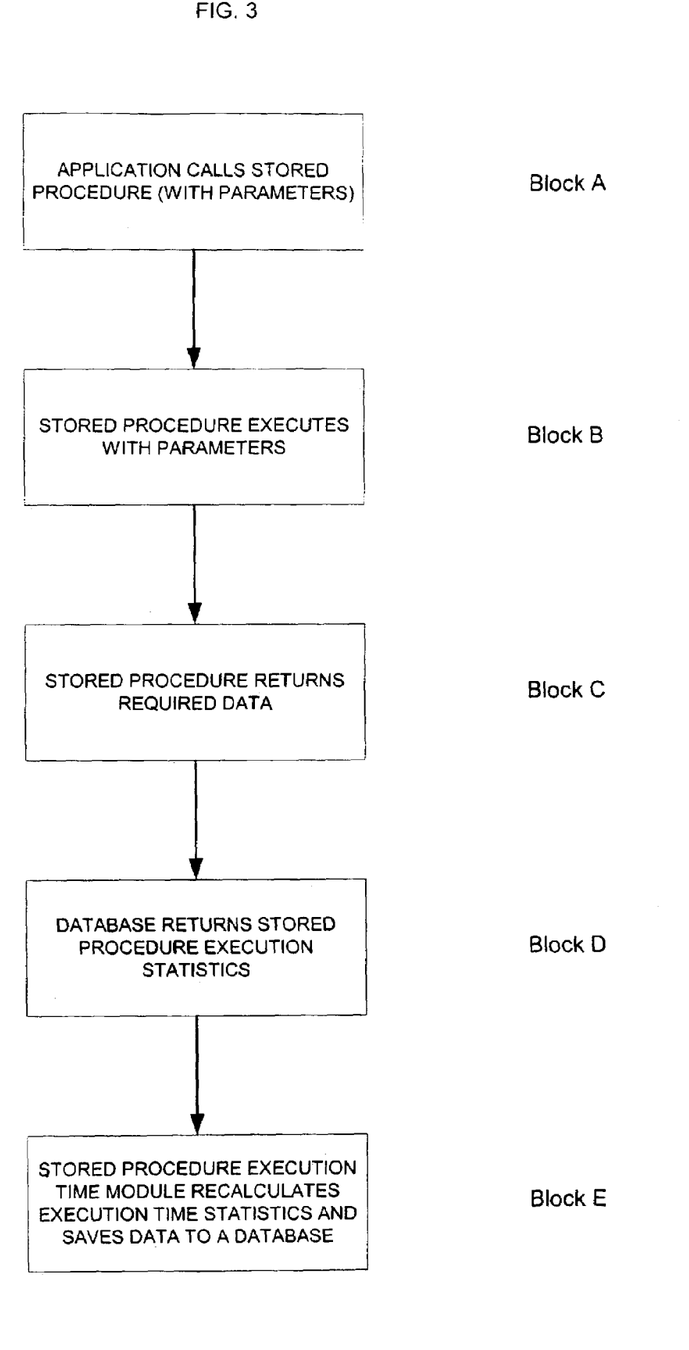
FIG. 3 is a simplified block diagram showing the steps of the method to measure stored procedure execution statistics.

FIG. 3 shows a simplified block diagram of the inventive technique. In block A, the application calls the stored procedure and includes with the call any needed parameters. Parameters are used as variables for procedure calls. For example, a database query for financial data related to a specific security for a specific time frame would pass the name of the security and the dates of interest as parameters along with the call. In block B, the stored procedure runs on the server, and in block C, returns the requested data.

In block D, the database program running on the server, returns the actual execution statistics that the procedure took to run. The statistics of primary interest are the total number of writes and reads to and from the database during a particular stored procedure run.

And, finally in block E, the module re-computes the execution statistics for that procedure based on the latest execution statistics, performs additional analysis, such as statistics based on time of day, other running applications, or current system operational capabilities. The single number of reads and writes, along with any other desired statistics, such as execution time for that procedure are then logged to the procedure execution database.

Figure 4:
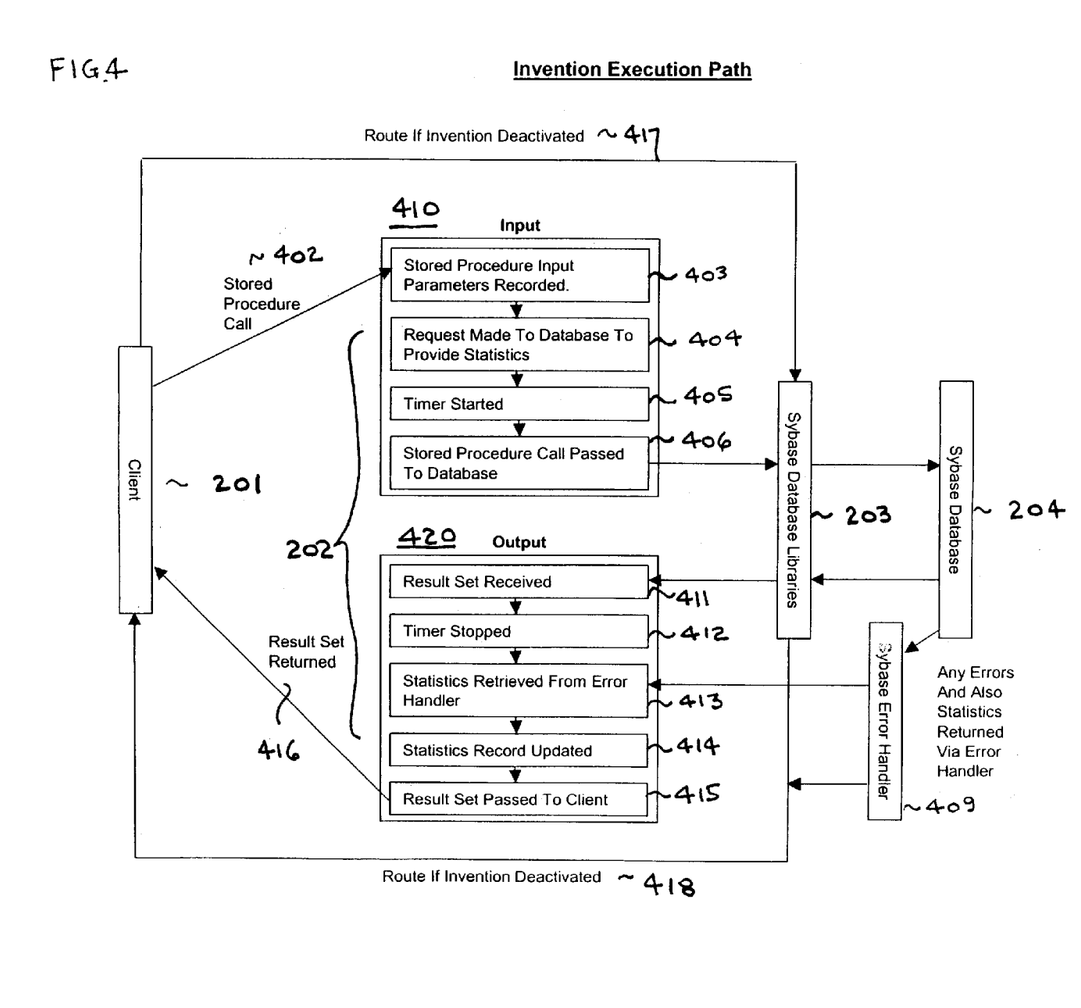
FIG. 4 shows a more detailed block diagram of one embodiment of the invention.

FIG. 4 shows a more detailed view of the statistics module 202. Client 201 makes stored procedure call 402. The parameters to be sent to the stored procedure are recorded 403 as the first step of the input process 410, the request to provide statistics for the upcoming call, is made to the database 404, a timer is started 405, and the call is passed to the database supervisory program 406. The database library 203 (such as the commercial program Sybase) contains the stored procedures. Acting under control of the database supervisory program (not explicitly shown), database library 203 executes the stored procedure with the supplied parameters. The library retrieves the data corresponding to the request made by the call to the stored procedure from database 204. Any errors that occurred during the execution of the stored procedure as well as the statistics for that call are developed and returned by error handler 409. The resultant set of data 411 is received as the beginning of the output process 420. Then the timer is stopped 412, the statistics are retrieved from the error handler 413, the statistics are analyzed and the statistics records are updated and saved to the statistics database 414, and finally the results are passed back 416 to the client, thus satisfying the original call to the stored procedure. When the stored procedure statistics module is switched off, the inventive path is bypassed by calling path 417 and return path 418.

Figure 5:
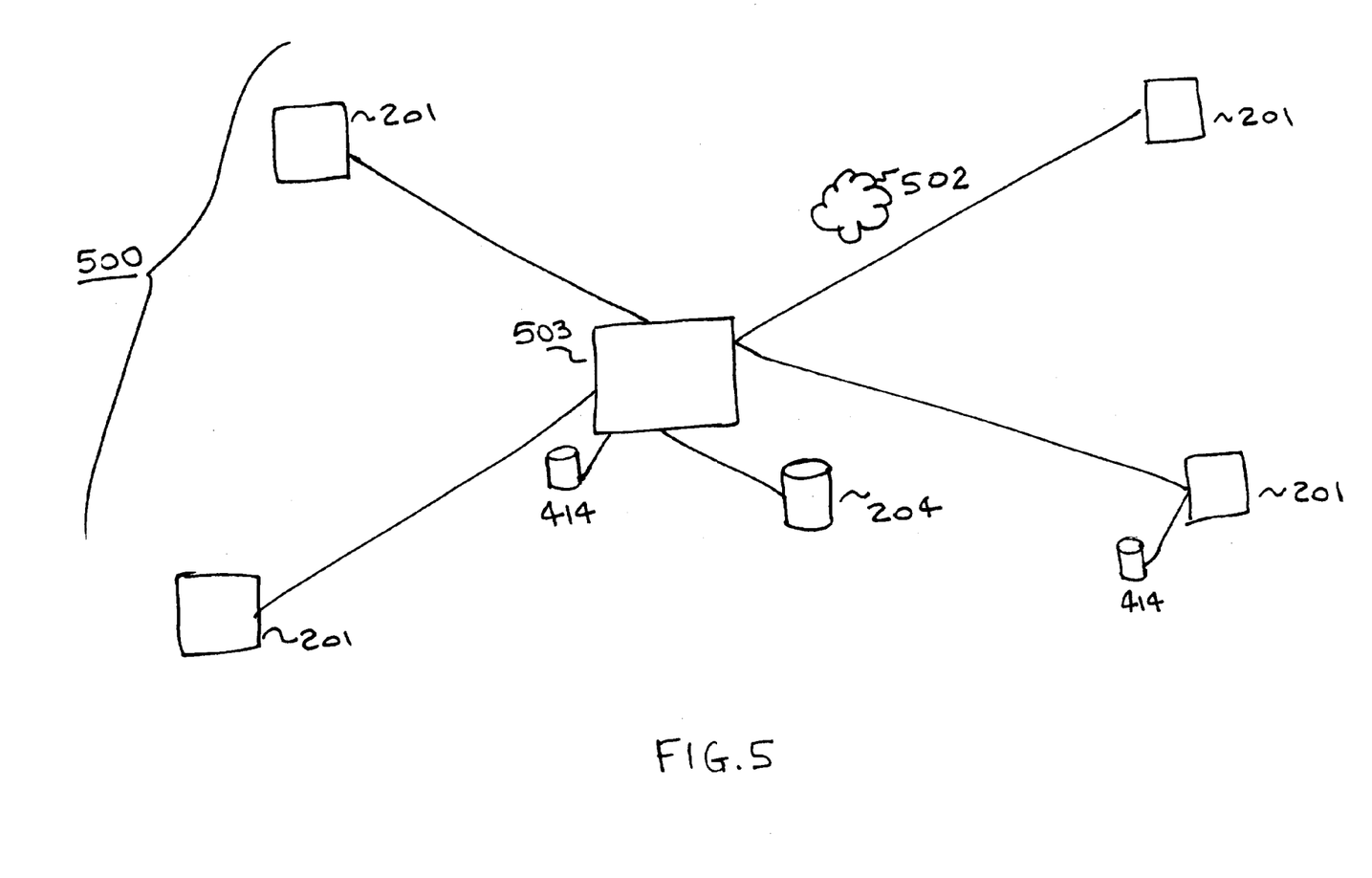
FIG. 5 shows a block diagram of a client server environment in the context of a network.

FIG. 5 shows an exemplary network 500 comprising computer server 503 with an associated database 204 serving client terminals 201. Clients are typically linked to the server by networks 502 comprising both intranets and the internet. Statistics database 414 can reside at server 503 or at one or more of the clients 201. Statistics module 202 can run on client computer 201, or on server 503 in which case it can parse requests and returned statistics according to which client terminals 201 called a given procedure.

Figure 6:
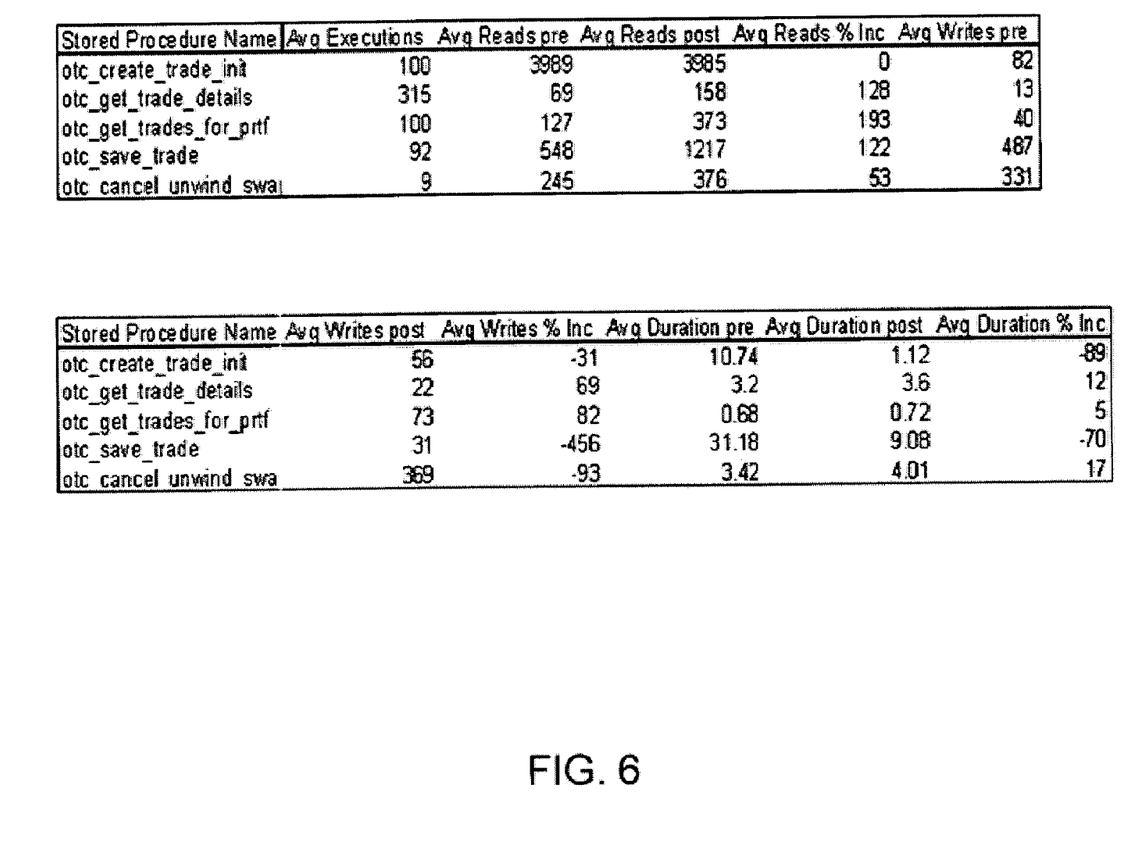
FIG. 6 shows a sample output of stored procedure statistics.

FIG. 6 shows a sample stored procedure statistics output. The raw statistical data can be written to a computer writeable media in a standard output format such as comma separated variables (.csv). The .csv format is suitable for viewing the data in a spreadsheet program such as Microsoft Excel. In the example, the resultant statistics are shown for the multiple executions of 5 stored procedures.

The "Avg executions" column is the average number of times the stored procedure has been called to get the statistical data. It is:

Avg executions=(the number of times the procedure was called after being modified (pre)+the number of time it was called before being modified (post))/2.

Reads and writes are database reads and writes. Duration is the actual time the stored procedure took to execute. Generally the number of reads and writes and how they change after the procedure is modified (post) is a better indicator of performance than the execution time.

The greater the number of calls, the more thoroughly the stored procedure is likely to have been tested, that is it has been called more times and therefore is more likely to have been called with a greater variety of inputs on a greater variety of database states. The output data can be examined by looking for high percentage increases particularly regarding the reads and writes. Sometimes large increases in percentages can be justified if the procedure was updated to have a more complex functionality. In other cases, the changes to the procedure have caused it to become inefficient, in which case the procedure can be re-written and re-tested.

EXAMPLE

A software module in the Pyramid Transaction Processing (PTP) application, a financial trading program, requests a result from the error handler of a Sybase database for each stored procedure execution. The error handler reports the actual number of database writes and reads done while the stored procedure executed. The reported number of reads and writes as recorded by the Sybase database, for the given set of input parameters, and at a given time of day for analyzing the performance of the computer resources under which the database was running at that moment of time.

The procedure execution statistics can be logged in a database, and statistically processed by stored procedure name and other categories of operating parameters, such as time of day, or by particular types of operations of the PTP application program. Statistics calculated by the module can be logged to a stored procedure execution time database.

The method is particularly useful for testing a new version of the PTP application. Here, a regression test is performed. A regression test involves creating a simulation of an entire trading group of users with a continuous input stream of PTP application operations causing intensive simulated calls to stored procedures.

The regression test is done by setting up many client terminals on the actual network. But, instead of incurring the inherent risk of "beta testing", these terminals are programmed to simulate a financial trader's typical daily routine, without executing any actual financial transactions. During the regression test, which might last for several weeks, the stored procedure execution module runs in background collecting execution statistics, performing statistical analysis of the execution statistics and logging the data and analysis to a database.

The module collects execution statistics for all stored procedure executions. These statistics are then automatically evaluated against typical execution statistics for the same or similar stored procedure statistics as measured in the actual operating environment of the previous version currently in service on the trader's desks. Any anomalous statistics are flagged for further investigation by the application's programmers and system analysts.

Similarly, a modified PTP stored procedure or a new procedure can be checked either in regression testing, or in the actual trading environment. Comparison can be made to the execution time of similar type procedures or to predicted execution statistics.

And, finally an alarm system can be set up to warn system operators and users or potential application faults or errors as indicated by anomalous procedure execution statistics in the normal running environment.

We claim:

1. A method of evaluating the performance of a business or financial software application comprising the steps of:
    providing a stored procedure to interact with a database;
    executing the stored procedure in a stored procedure execution time;
    querying the database for the stored procedure execution statistics including reads and writes of the database;
    analyzing the stored procedure execution statistics to generate a set of stored procedure execution statistics based on many runs;
    evaluating the analysis by comparison to a set of predicted or previously recorded execution statistics; and
    modifying the stored procedure when the evaluation shows the performance has degraded as compared to the predicted or previously recorded statistics.

2. The method according to claim 1 further comprising the step of recording the stored procedure execution statistics to the database.

3. The method according to claim 1 wherein the stored procedure statistics include the reads and writes of the database.

4. The method according to claim 1 further comprising the step of flagging a problematic stored procedure when its number of reads and writes exceeds a computed value derived from past statistical analysis.

5. The method according to claim 1 further comprising the step of flagging a problematic stored procedure when its execution time exceeds a predicted value.

6. The method according to claim 1 wherein the stored procedure statistics include the execution time for the stored procedure.

7. The method according to claim 1 wherein the database is Sybase.

8. The method according to claim 7 further comprising the step of returning the stored procedure execution time from an error handler in the Sybase database.

9. The method according to claim 1 further comprising the step of evaluating the statistical analysis during regression testing.

10. The method according to claim 1 further comprising the step of evaluating the statistical analysis following a change to stored procedure.

11. The method according to claim 1 further comprising the step of evaluating the statistical analysis following the addition of a new stored procedure to the application software.

12. The method according to claim 1 further comprising the step of flagging a problematic stored procedure when its execution time exceeds a computed value derived from past statistical analysis.

13. A method of evaluating the performance of a business or financial software application comprising the steps of:
provide a stored procedure to interact with a database;
starting a timer;
executing the stored procedure in a stored procedure execution time;
stopping the timer;
reading the timer to register the total execution time from call to returned data;
querying the database for the stored procedure execution statistics including the number of reads and writes of the database;
analyzing the stored procedure execution statistics and total execution time to generate a set of stored procedure execution statistics based on many runs;
evaluating the analysis by comparison to a set of predicted or previously recorded execution statistics; and
modifying the stored procedure when the evaluation shows the performance has degraded as compared to the predicted or previously recorded statistics.

14. A method of evaluating the performance of a business or financial software application in a simulated trading environment comprising the steps of:
providing a stored procedure to interact with a database;
providing client terminals programmed to simulate normal trading activities on a network;
performing a regression test caused by simulated trades from multiple terminals;
executing stored procedures according to the simulated trades;
querying the database for the stored procedure execution statistics including the number of reads and writes of the database;
analyzing the stored procedure execution statistics to generate a set of stored procedure execution statistics based on many runs;
evaluating the analysis by comparison to a set of predicted or previously recorded execution statistics; and
modifying the stored procedure when the evaluation shows the performance has degraded as compared to the predicted or previously recorded statistics.

15. The method according to claim 14 further comprising re-running the steps of the method following a change to a stored procedure.

16. A method of evaluating the performance of a business or financial software application comprising the steps of:
providing a stored procedure to interact with a database;
executing the stored procedure in a stored procedure execution time;
querying the database for the stored procedure execution statistics including reads and writes of the database;
returning the stored procedure execution time from an error handler in the database;
analyzing the stored procedure execution statistics to generate a set of stored procedure execution statistics based on many runs;
evaluating the analysis by comparison to a set of predicted or previously recorded execution statistics; and
modifying the stored procedure when the evaluation shows the performance has degraded as compared to the predicted or previously recorded statistics.

* * * * *